Patented Sept. 20, 1932

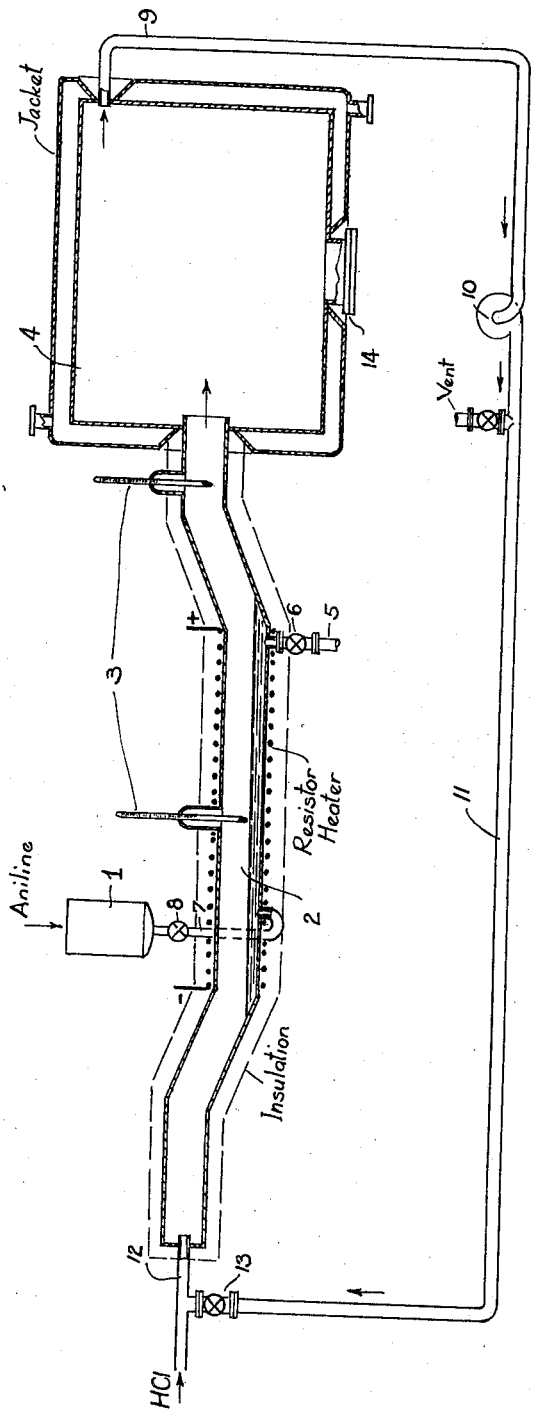

1,878,512

UNITED STATES PATENT OFFICE

MARK E. PUTNAM AND LINDLEY E. MILLS, OF MIDLAND, MICHIGAN, ASSIGNORS TO THE DOW CHEMICAL COMPANY, OF MIDLAND, MICHIGAN, A CORPORATION OF MICHIGAN

PREPARATION AND PURIFICATION OF PRIMARY AROMATIC AMINE HYDROHALIDES OF THE BENZENE SERIES

Application filed September 14, 1929. Serial No. 392,729.

The present invention relates to the preparation of amine hydrohalides, particularly aromatic amine hydrohalides, and more particularly to methods for the preparation of aniline hydrochloride.

In a pending application by Lindley E. Mills, one of the present inventors, Serial No. 392,727, filed September 14, 1929, a method for the purification of amine hydrohalides has been disclosed, in which such compounds are vaporized and condensed in the presence of the corresponding hydrogen halide gas. We have now found that such method may be modified and adapted for the conjoint preparation and purification of an amine hydrohalide, when the body of hydrohalide being vaporized is continually renewed by preparation of further quantities thereof "in situ" by the addition of free amine to the hydrohalide being vaporized, the amine then reacting with the hydrogen halide gas present to form the corresponding hydrohalide, which in turn is vaporized and removed from the reaction vessel.

In such improved method for the conjoint formation and purification of amine hydrohalides the operative steps are reduced in number and less apparatus is required than in methods hitherto employed. High boiling impurities, such as diphenylamine, or oxidation products remain behind as a residue in the vaporization zone, and a pure, white, dry product is obtained without resorting to the use of solvents or diluents with the disadvantages attendant upon the use thereof.

To the accomplishment of the foregoing and related ends, the invention, then, consists of the method and means hereinafter fully described and pointed out in the claims, the annexed drawing and following description setting forth in detail certain means and modes of carrying out the invention, such modes illustrating, however, but several of various ways in which the principle of the invention may be used.

In said annexed drawing:—
The single figure there appearing illustrates diagrammatically one form of apparatus suitable for carrying out our new and improved process.

Referring to the drawing, a reservoir 1 is connected to a tubular reactor 2 by means of a pipe 7 which is provided with a valve 8. Said reactor is provided with an exit pipe 5 which is fitted with a valve 6. Heating means is provided for said reactor, here shown as an externally wound electric resistor wire. Thermometers 3 are inserted into the reactor space as shown. Reactor 2 connects at one end with a cooling and condensing chamber 4, and at the opposite end thereof is provided with a gas inlet 12. Pipe 5 is for the purpose of withdrawing residual materials from the reactor. Exit tube or pipe 9 leads from chamber 4 to a circulatory pump 10 which in turn is connected by means of pipe 11 with gas inlet 12, pipe 11 being provided with a valve 13 just preceding its junction with gas inlet 12. A covered opening 14 is provided in chamber 4 for discharging the product.

Aniline, or other amine, is gradually introduced from reservoir 1 by means of tube 7 into reactor 2 which is heated sufficiently to vaporize such amine and also the amine salt resulting from the reaction. Gaseous hydrogen halide, e. g. hydrogen chloride, enters reactor 2 through inlet 12 and reacts with the amine in liquid and/or vapor state to form the corresponding amine hydrohalide which is carried by the gas current into cooling chamber 4 wherein the greater part thereof is condensed. Residual gases, which may carry a small amount of product, pass from cooling chamber 4 through tube 9 and are recycled by means of circulating pump 10 and pipe 11, such gases reentering the reactor through inlet pipe 12.

The following detailed examples are given by way of illustration of our improved method, but it is understood that such examples are not to be interpreted as a limitation upon the invention.

Example 1

50 grams aniline is run slowly into reactor 2, heated to 200–215° C., through which a stream of anhydrous gaseous hydrogen chloride is constantly passing. An excess of hydrogen chloride over that required to combine with the aniline to form aniline hydrochloride is used in order to carry vapors of the latter into a cooling chamber 4 where condensation takes place. The excess of gaseous hydrogen chloride which passes on through the cooling chamber, is recycled by means of pump 10. The yield of pure, white, crystalline aniline hydrochloride, (M. p. 198° C.) is practically quantitative.

*Example 2*

50 grams of ortho-toluidine is likewise run slowly into said reactor 2, heated to 215–225° C. through which a current of dry gaseous hydrogen chloride is constantly passing, and the product obtained in a manner similar to Example 1. The yield of white, crystalline ortho-toluidine hydrochloride (M. p. 213° C.) is practically quantitative.

*Example 3*

Aniline hydrobromide is obtained by a procedure similar to that mentioned in Example 1, the yield being almost quantitative, and the product melting at 285° C.

We do not limit our invention to the materials specifically mentioned in the examples. Other equivalent amines, e. g. the alkyl aliphatic amines, or other aromatic amines such as anilines wherein either the nitrogen or the ring or both may be substituted by one or more groups such as alkyl groups, may be utilized by restricting the vaporization temperature below that point at which decomposition or rearrangement of the amine hydrohalide product may occur. The hydrogen halide gas used, may be diluted with a gas unreactive with the reaction components, i. e. nitrogen, and the vaporized salt may be carried to the cooling chamber by a current of such diluted gas. The process may be operated either in batch or continuously, and may be carried out under either reduced or increased pressure, if desired.

When aniline hydrochloride is heated to about 220° C., dissociation thereof into aniline and hydrochloric acid begins to take place, and at about 245° C. a mixture of aniline hydrochloride and a small amount of free aniline distills, the presence of the aniline resulting in a discolored product or one which becomes so on standing, especially in contact with air. However, if the vaporization is carried out in such way that the vapors are condensed in an atmosphere of hydrochloric acid, the product condensed consists of a pure aniline hydrochloride substantially uncontaminated by free aniline. The upper temperature limit for the vaporization of aniline hydrochloride in an atmosphere of hydrochloric acid is approximately 250° C., above which decomposition thereof begins to occur with formation of rearrangement, condensation, or decomposition products, such as diphenylamine, etc. For other amine hydrohalides the temperatures employed may vary somewhat from the above figures depending upon the particular salt employed.

In summation, our invention involves reacting in absence of a solvent, between an amine and a hydrogen halide gas, i. e. hydrogen chloride or hydrogen bromide, vaporizing the reaction product in presence of excess of the latter, separating said product from excess hydrogen chloride gas and returning the latter to the initial reaction step.

Among the advantages of the present new and improved method are, (1) a dry product is obtained directly from the reaction components, (2) such product is of the highest purity, further purification thereof being unnecessary, (3) essentially quantitative yields are obtained, (4) the use of solvents or diluents with attendant disadvantages is eliminated, (5) frequent handling of materials is avoided, and (6) the purified product may be produced at a lower cost.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In a method of making a primary aromatic amine hydrohalide of the benzene series, the steps which consist in reacting a primary aromatic amine of the benzene series with a gaseous hydrogen halide in the absence of a solvent, and simultaneously vaporizing the aromatic amine hydrohalide formed, removing the vapors from the reaction zone, and separately condensing said amine hydrohalide in the presence of an excess of the gaseous hydrogen halide.

2. In a method of making a primary aromatic amine hydochloride of the benzene series, the steps which consist in reacting a primary aromatic amine of the benzene series with gaseous hydrogen chloride in the absence of a solvent, and simultaneously vaporizing the aromatic amine hydrochloride formed, removing the vapors from the reaction zone and separately condensing said amine hydrochloride in the presence of excess gaseous hydrogen chloride.

3. In a method of making an aniline hydrohalide, the steps which consist in reacting aniline with a gaseous hydrogenhalide in the absence of a solvent and simultaneously vaporizing the aniline hydrohalide formed, removing the vapors from the reaction zone, and separately condensing the aniline hydrohalide in the presence of an excess of the gaseous hydrogen halide.

4. In a method of making aniline hydrochloride, the steps which consist in reacting aniline with gaseous hydrogen chloride in the absence of a solvent and simultaneously vaporizing the aniline hydrochloride formed, removing the vapors from the reaction zone, and separately condensing the aniline hydrochloride in the presence of excess gaseous hydrogen chloride.

5. In a method for the conjoint preparation and purification of a primary aromatic amine hydrohalide of the benzene series, the steps which consist in vaporizing such amine hydrohalide in the presence of a current of the corresponding hydrogen halide gas and simultaneously increasing the quantity of said aromatic amine hydrohalide by introducing the corresponding primary aromatic amine of the benzene series to the vaporizing zone, whereby additional aromatic amine hydrohalide is formed.

6. In a method for the conjoint preparation and purification of aniline hydrochloride, the steps which consist in vaporizing said compound in the presence of a current of gaseous hydrogen chloride and simultaneously introducing aniline into the vaporizing zone, whereby an additional quantity of vaporized aniline hydrochloride is formed and removed from the reaction zone, separately condensing the vaporized aniline hydrochloride in the presence of excess gaseous hydrogen chloride, and returning the latter to the process.

Signed by us this 11th day of September, 1929.

MARK E. PUTNAM.
LINDLEY E. MILLS.